United States Patent [19]
Inoue et al.

[11] Patent Number: 5,879,599
[45] Date of Patent: Mar. 9, 1999

[54] METHOD OF MOLDING GOLF BALLS

[75] Inventors: Michio Inoue; Keisuke Ihara, both of Chichibu, Japan

[73] Assignee: Bridgestone Sports Co., Ltd., Tokyo, Japan

[21] Appl. No.: 676,803

[22] Filed: Jul. 8, 1996

Related U.S. Application Data

[63] Continuation-in-part of Ser. No. 358,457, Dec. 19, 1994, abandoned.

[30] Foreign Application Priority Data

Dec. 21, 1993 [JP] Japan .................................. 5-346342

[51] Int. Cl.[6] ........................... B29C 45/14; B29C 70/70; B29C 33/10; B29C 33/12
[52] U.S. Cl. ........................ 264/102; 264/271.1; 264/278
[58] Field of Search .................................... 264/102, 259, 264/271.1, 275, 277, 278; 425/DIG. 812, 546, 116

[56] References Cited

U.S. PATENT DOCUMENTS

| | | | |
|---|---|---|---|
| 5,518,385 | 5/1996 | Graff | 264/102 |
| 5,540,576 | 7/1996 | Kawakita et al. | 264/102 |
| 5,639,419 | 6/1997 | Pennisi et al. | 264/102 |

*Primary Examiner*—Angela Ortiz
*Attorney, Agent, or Firm*—Sughrue, Mion, Zinn, Macpeak & Seas, PLLC

[57] ABSTRACT

A method of molding a golf ball including the steps of;

standing support pins in a cavity of a golf ball molding die composed of lower and upper dies having a mating surface, supporting a core of the golf ball by the support pins such that the core is positioned at the center of the cavity, reducing the pressure in the cavity to a degree of 400 to $1 \times 10^{-3}$ Torr by a vacuum pump operably coupled to a vent pin clearance formed between a vent pin and the inner wall of a vent pin hole in which the vent pin is inserted and a support pin clearance formed between the support pin and the inner wall of a support pin hole in which the support pin is inserted, the vent pin clearance and the support pin clearance being formed in the range of from 5 $\mu$m to 25 $\mu$m at the top portions of the vent pin hole and the support pin hole, and injection molding a golf ball-forming material to fill the space and curing the material.

8 Claims, 2 Drawing Sheets

METHOD OF MOLDING GOLF BALLS

CROSS REFERENCE TO RELATED APPLICATION

This application is a continuation-in-part of application Ser. No. 08/358,457 filed on Dec. 19, 1994, now abandoned, the entire contents of which are hereby incorporated by reference.

BACKGROUND OF THE INVENTION

1. Field of the Invention

The present invention relates to a method of molding a golf ball, and more particularly, it is concerned with a method of molding a synthetic resin cover enclosing a core of a golf ball, or an upper or intermediate synthetic resin layer of a multiple-piece solid golf ball. The present invention also relates to a golf ball molding die.

2. Description of the Prior Art

Solid golf balls such as two-piece golf balls are usually constructed of a spherical core which comprises polybutadiene rubber as a main component and a cover enclosing the core which comprises a resin such as an ionomer resin as a main component.

The conventional method of molding such a golf ball comprises the steps of standing three or more support pins in the cavity of the mold, placing a core thereon such that it is positioned at the center of the cavity, filling a cover-forming material into the cavity, i.e., between the core and the inner surface of the mold, and curing the cover-forming material.

At the time of molding a golf ball according to the above conventional method, if air is sealed in the cavity of the mold upon filling a resin (cover-forming material), the resin filled lacks continuity, and this causes such defects as scorching, air mark, weld, and the like.

Therefore, it is necessary to evacuate from the cavity, air and gas which is generated from the filled synthetic resin. To this end, the conventional molding is carried out by providing the mold with a vent hole and evacuating air and the gas by natural ventilation through the vent hole from the cavity.

FIG. 1 illustrates a lower die A of a conventional mold for golf ball molding, which has an air vent pin 1 inserted in a vent pin hole 3 and a support pin 2 inserted in a support pin hole 5. A core 10 of a golf ball is placed on the support pins 2, and then an upper die B (the same construction as in the lower die A, although not shown) is closed. Thereafter a synthetic resin for forming a cover is introduced into the cavity (between the inner surface of the mold and the core 10) to injection mold the cover. In this case, the internal air and the gas emanating from the synthetic resin are discharged from the cavity by natural venting through the clearances between the air vent pin 1 and the wall of the vent pin hole 3 as well as the support pin 2 and the wall of the support pin hole.

In the natural venting method by vent holes provided for the mold, when the plasticized synthetic resin enters into the cavity, the air in the cavity and the gas emanating from the synthetic resin are pushed out and discharged through the vent holes from the cavity. However, if the vent holes provided for the mold are too small, poor venting results, causing such defects as scorching, air mark, and weld. On the other hand, if the vent hole is too large, the resin flows thereinto and is cured as such to form a flash, and substantial labor is consumed for finishing to remove the flash.

It is a usual practice for filling the synthetic resin into the cavity to employ the injection molding method. However, if the injection speed of the synthetic resin is too fast, the speed of evacuating air and the gas from the cavity by natural venting does not catch up with the injection speed, resulting in the remain of air and the gas in the synthetic resin, and this also causes such defects as scorching, air mark, and weld. Therefore, it is difficult to speed up the step of injection molding so fast in the conventional method of molding a golf ball.

SUMMARY OF THE INVENTION

The present invention is intended to eliminate the occurrence of defects of golf balls due to inadequate ventilation by making the evacuation of air and the gas in the cavity complete, especially when the cover is molded with a high injection speed.

Accordingly, it is an object of the present invention to provide a method of molding a golf ball which decreases in defects such as scorching, air mark, weld and the like with improved dimple shaping, even when an injection speed is high.

It is another object of the present invention to provide a method of molding a golf ball which decreases the occurrence of flash at the vent hole.

It is a further object of the present invention to provide a golf ball molding die by which a golf ball having few defects such as scorching, air mark, weld and the like, and little flash at the vent hole can be molded even when an injection speed is high.

To achieve the above objects, the present invention provides a method of molding a golf ball comprising the steps of;

standing support pins in a cavity of a golf ball molding die composed of lower and upper dies having a mating surface, supporting a core of the golf ball by said support pins such that said core is positioned at the center of the cavity, reducing the pressure in the cavity to a degree of 400 to $1 \times 10^{-3}$ Torr by a vacuum pump operably coupled to a vent pin clearance formed between a vent pin and the inner wall of a vent pin hole in which the vent pin is inserted and a support pin clearance formed between the support pin and the inner wall of a support pin hole in which the support pin is inserted, said vent pin clearance and said support pin clearance being formed in the range of from 5 µm to 25 µm at the top portions of the vent pin hole and the support pin hole, and injection molding a golf ball-forming material to fill the space and curing the material.

In a preferred embodiment, the air vent pin and the vent pin hole are omitted, and the pressure reduction by the vacuum pump and the evacuation of air and the gas in the cavity are conducted only through the support pin clearance.

Accordingly, the present invention also provides a method of molding a golf ball comprising the steps of;

standing support pins in a cavity of a golf ball molding die composed of lower and upper dies having a mating surface and support pin holes in which the support pins are provided movably in the axial direction so that a support pin clearance is formed between the support pin hole wall and the outer peripheral surface of the support pin, and the width of the clearance is from 8 µm to 25 µm at the top portion of the hole, supporting a core of the golf ball by said support pins such that said core is positioned at the center of the cavity, reducing the pressure in the cavity to a degree of 400 to $1 \times 10^{-3}$ Torr by a vacuum pump operably coupled to said support pin clearances, and injection molding a golf ball-forming material to fill the cavity and curing the material, whereby air in said cavity and gas emanating from said material are evacuated from the cavity only through said support pin clearances.

This method can eliminate the chance of the occurrence of flash.

To effect the above preferred golf ball molding method, the present invention provides a mold for a golf ball which comprises lower and upper dies having a mating surface and forming a cavity upon mating in which a core of a golf ball is provided, said lower and upper dies having support pin holes in which support pins are provided movably in the axial direction so that a support pin clearance is formed between the support pin hole wall and the outer peripheral surface of the support pin, and the width of the clearance is from 8 μm to 25 μm at the top portion of the hole, and a vacuum pump operably coupled to said support pin clearance thereby reducing the pressure in the cavity only through said support pin clearances.

The present invention is designed to perform injection molding while reducing the pressure in the cavity when a golf ball-forming material, especially a cover-forming material, including a synthetic resin, a rubber or elastomer or a mixture of synthetic resin and rubber is injection molded into the cavity. In the present invention, since there is substantially no air in the cavity, it suffices if only the gas emanating from the material is discharged, and the gas to be discharged at the time of filling of the material is reduced. Therefore, it is possible to make a vent hole smaller than the conventional one, and it is also possible to reduce the size of the vent hole so that the material does not enter but only ventilation is possible.

The molding method of golf balls according to the present invention can be utilized not only for the molding of covers but also for the molding of one-piece solid golf balls and an upper or intermediate layer of multiple-piece solid golf balls such as three-piece golf balls.

According to the present invention, the resulting golf balls decrease in defects such as scorching, air mark, and weld, and the filling of the material forming a golf ball to the cavity can be perfectly effected and the transfer (shaping) of dimples can also be improved.

Moreover, according to the present invention, it is possible to make the vent hole of the cavity small, and it is also possible to mold golf balls almost free of flash at the part of the vent hole.

Furthermore, according to the present invention, the injection speed can be increased.

DESCRIPTION OF THE PREFERRED EMBODIMENTS

Figure 1:
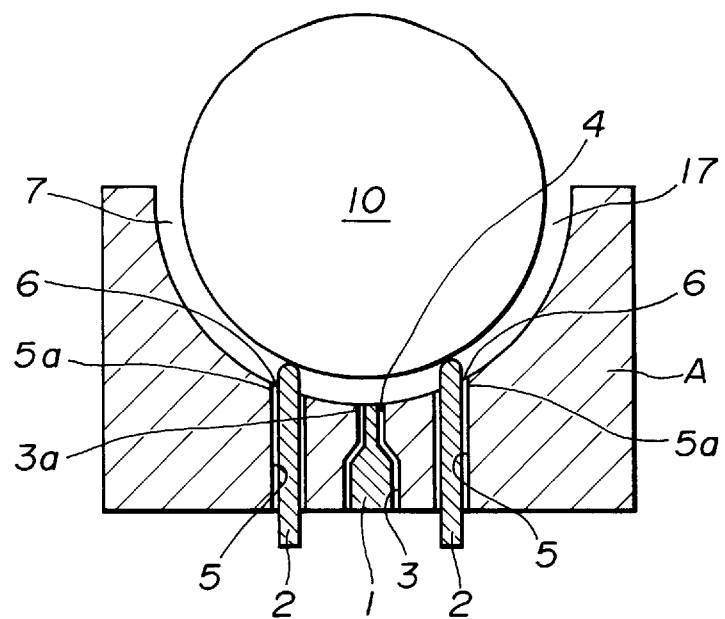
FIG. 1 is a sectional view of one embodiment of a lower die for molding golf balls.
Figure 2:
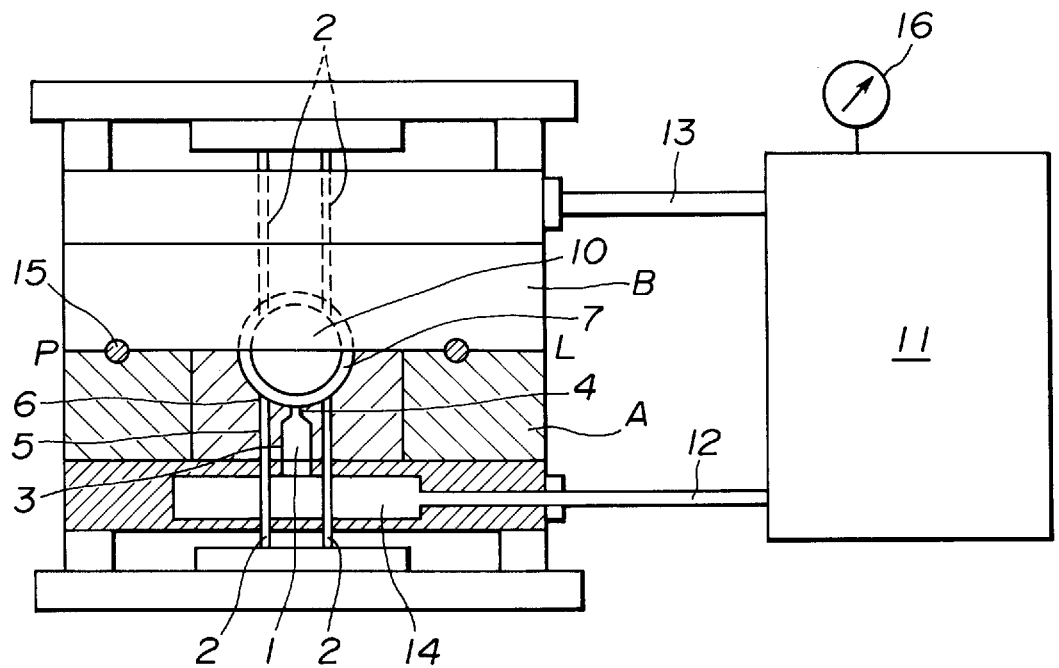
FIG. 2 is a schematic diagram of the molding method of golf balls according to the present invention.

The method of molding a golf ball according to one embodiment of the present invention uses a mold shown in FIGS. 1 and 2.

FIGS. 1 and 2 illustrate a lower die A having a vent pin hole 3 in which a vent pin 1 is provided so that a vent pin clearance 4 is formed between the inner wall 3a of the vent pin hole 3 and the outer peripheral surface of the vent pin 1. The lower die A also has support pin holes 5 in which support pins 2 are provided so that a support pin clearance 6 is formed between the inner wall 5a of the support pin hole 5 and the outer peripheral surface of the support pin 2. The upper die B has substantially the same construction as in the lower die A.

The number of the support pins 2 provided each for the lower die A and the upper die B is preferably 3 or more, more preferably 3 to 6.

The diameter of the support pin 2 is preferably in the range of 2 to 4 mm.

The support pins 2 are provided so that they move in the axial direction, i.e., the top portion of the support pins 2 protrudes in a cavity 7 and draws back to the upper portion of the support pin holes 5.

Figure 3:
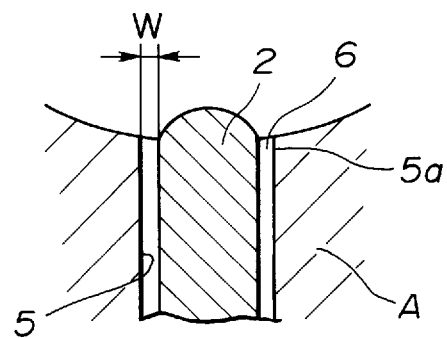
FIG. 3 is a partially sectional view of the lower die for molding golf balls.

Preferably, the top portion of each support pin 2 has a round figure which corresponds to a dimple to be formed on the surface of a golf ball. In this case, the top portion of the support pins 2 draws back to the surface of the cavity so that only the rounded top portion of the support pins 2 protrudes in the cavity as shown in FIG. 3, whereby the rounded top portion forms a dimple.

The width W of the vent pin clearance 4 and the support pin clearance 6 is in the range of 8 to 25 μm, preferably 8 to 20 μm, more preferably 10 to 18 μm at the top portion of the vent pin hole and the support pin hole, whereby the occurrence of molding flash is effectively prevented and the evacuation of air and the gas in the cavity 7 is effectively conducted. The resulting golf ball has few defects such as scorching, air mark, weld and the like without the occurrence of flash. If the clearance is too wide, molding flash would occur because the material would enter the clearances from the cavity. If the clearance is too narrow, venting in the cavity is adversely effected, resulting in defective molding.

As shown in FIG. 2, a vacuum pump 11 is provided to the mold so that the pressure in the cavity 7 is reduced by the vacuum pump 11 through the clearances 4 and 6. FIG. 2 is a schematic diagram showing the arrangement of the golf ball molding die and the vacuum pump, and pipes 12 and 13 extending from the vacuum pump 11 connect to the respective clearances 4 and 6 through a cave 14, whereby the pressure in the cavity is reduced when the vacuum pump 11 is actuated.

It is practical to perform sealing by arranging an O-ring 15 on the mating surface (parting line plane or PL plane) of the molding dies A and B. In FIG. 2, numeral 16 indicates a vacuum gauge.

In the practice of molding a golf ball by using the mold, the support pins 2 stand in the cavity 7 of the golf ball molding die and a core 10 of the golf ball is supported by the support pins 2 such that the core 10 is positioned at the center of the cavity 7. Then, the vacuum pump 11 is actuated to reduce the pressure in the cavity (a space 17 formed between the inner surface of the mold and the outer surface of the core 10 through the clearances 4 and 6). Thereafter, a material which forms a cover of the golf ball is injection molded to fill the space 17 and is cured. In this case, air in the cavity 7 and gas from the cover-forming material are evacuated from the cavity 7 through the clearances 4 and 6 by the vacuum pump. Therefore, the material is perfectly filled in the cavity and the molded golf ball has little defects such as scorching, air mark, and weld and has little molding flash at the clearance portions.

The material which forms a cover of the golf ball may be a resin such as an ionomer resin having a melt index of 1 to 100, preferably 1 to 15, a rubber or elastomer or a mixture of the resin and the rubber or elastomer as a main component.

Regarding the degree of pressure reduction in the cavity, it varies depending on the volume of the space 17 and the degree of flowability of the cover-forming material to be injected, although it is usually the degree of vacuum of 400 to $1 \times 10^{-3}$ (Torr), preferably 300 to $1 \times 10^{-2}$ (Torr), more preferably 200 to $5 \times 10^{-2}$ (Torr).

Figure 4:
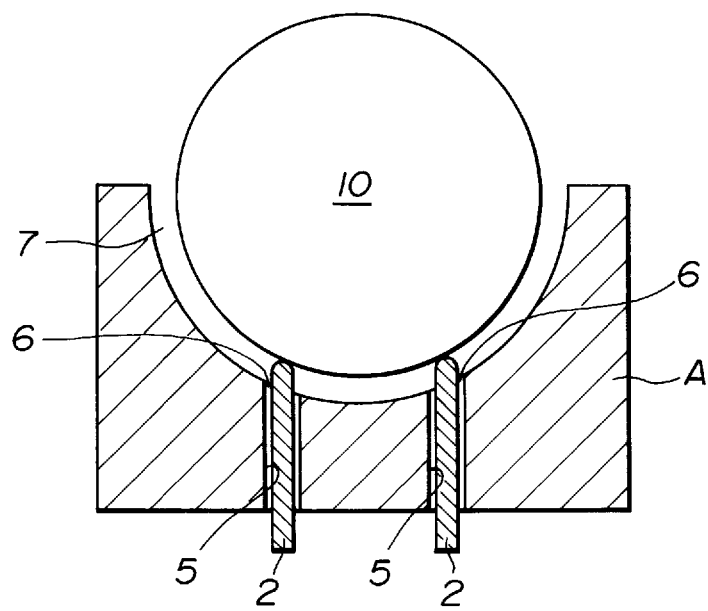
FIG. 4 is a sectional view of another embodiment of a lower die for molding golf balls.

FIG. 4 indicates another embodiment of the mold according to the present invention. This mold does not have an air vent pin and an air vent pin hole in which the air vent pin is provided but has only support pins 2 and the support pin holes 5. Since the mold does not have the air vent pin hole, the occurrence of flash due to the air vent pin clearance is eliminated. In this case, the top portion of the support pins is preferably formed to a rounded figure, as explained in FIG. 3, so that the top portion can form a dimple.

EXAMPLES

The invention will be explained in more detail with reference in the following examples.

The core of the golf ball is polybutadiene cured product, and the synthetic resin forming the cover is an ionomer resin. The temperature at the time of injection of the ionomer resin was 240° C., and the degree of vacuum in the cavity was under three conditions of 0.15, 200, and 760 (Torr). As the cooling medium of the molding die, water was used.

Example 1

Under the above-mentioned conditions, 50,000 pieces of each golf ball were molded, and the number of defects, i.e. scorching, air mark, and weld imperfection was compared, and it was found that the fraction defective when the degree of vacuum in the cavity was set to 0.15 or 100 Torr was less than a half of the fraction defective in the case where the degree of vacuum was 760 Torr.

From this result, it was found that reducing the pressure in the cavity decreases the fraction of defective products, and that the high-speed injection molding became possible and therefore the increase of molding efficiency became possible according to the golf ball molding method of the present invention.

Example 2

Under the above-mentioned conditions, 20 pieces of each golf ball were molded, and on measuring their weight, it was found that the average weight of golf balls under each condition was the greatest when the degree of vacuum was set to 0.15 Torr and the second was the ball which had been molded at the degree of vacuum of 200 Torr.

From this result, it was found that the filling with the synthetic resin becomes good and the weight increases by reducing the pressure in the cavity. Moreover, the molding accuracy of the dimples formed on the surface of the golf ball by transferring the dimple pattern on the surface of the cavity is also improved.

What is claimed is:

1. A method of molding a golf ball comprising the steps of:
    standing support pins in a cavity of a golf ball molding die composed of lower and upper dies each having a mating surface,
    supporting a core of the golf ball by said support pins such that said core is positioned at the center of the cavity,
    reducing pressure in the cavity to a degree of 400 to $1 \times 10^{-3}$ Torr by a vacuum pump operably coupled to a vent pin clearance formed between a vent pin and an inner wall of a vent pin hole in which the vent pin is inserted and a support pin clearance formed between a support pin and an inner wall of a support pin hole in which the support pin is inserted, said vent pin clearance and said support pin clearance being formed in the range of 5 μm to 25 μm at top portions of the vent pin hole and the support pin hole, and
    injection molding a golf ball-forming material to fill remaining space in said cavity and, curing the material.

2. The method of claim 1 wherein an O-ring is arranged on the mating surface of the lower and upper dies.

3. The method of claim 1 wherein said vent pin clearance and said support pin clearance are in the range of 8 to 20 μm and, the pressure is reduced to 200 to $5 \times 10^{-2}$ Torr.

4. The method of claim 1 wherein the material is an ionomer resin having a melt index of 1 to 100.

5. A method of molding a golf ball comprising the steps of:
    standing support pins in a cavity of a golf ball molding die composed of lower and upper dies each having a mating surface and support pin holes in which the support pins are provided movably in a direction of movement so that a support pin clearance is formed between a support pin hole wall and an outer peripheral surface of a support pin, and a width of the clearance is in the range of 8 μm to 25 μm at a top portion of the hole,
    supporting a core of the golf ball by said support pins such that said core is positioned at the center of the cavity,
    reducing pressure in the cavity to a degree of 400 to $1 \times 10^{-3}$ Torr by a vacuum pump operably coupled to said support pin clearances, and
    injection molding a golf ball-forming material to fill the cavity and curing the material,
    wherein air in said cavity and gas emanating from said material are evacuated from the cavity only through said support pin clearances.

6. The method of claim 5 wherein an O-ring is arranged on the mating surface of the lower and upper dies.

7. The method of claim 5 wherein said vent hole clearance and said support pin clearance are in the range of 8 to 20 μm and, the pressure is reduced to 200 to $5 \times 10^{-2}$ Torr.

8. The method of claim 5 wherein the material is an ionomer resin having a melt index of 1 to 100.

* * * * *